(12) United States Patent
Xiao et al.

(10) Patent No.: US 9,529,394 B2
(45) Date of Patent: Dec. 27, 2016

(54) FIRE AND RADIATION-PROOF ENCLOSURE FOR ELECTRONIC DEVICE

(71) Applicants: HONG FU JIN PRECISION INDUSTRY (WuHan) CO., LTD., Wuhan (CN); HON HAI PRECISION INDUSTRY CO., LTD., New Taipei (TW)

(72) Inventors: Yu-Ming Xiao, Wuhan (CN); Liang-Chin Wang, New Taipei (TW); Chiang-Jen Chung, New Taipei (TW); Zan Li, Wuhan (CN)

(73) Assignees: HONG FU JIN PRECISION INDUSTRY (WuHan) CO., LTD., Wuhan (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/788,433

(22) Filed: Jun. 30, 2015

(65) Prior Publication Data

US 2016/0349804 A1 Dec. 1, 2016

(30) Foreign Application Priority Data

May 29, 2015 (CN) .......................... 2015 1 0285342

(51) Int. Cl.
*H05K 5/00* (2006.01)
*G06F 1/18* (2006.01)
*H05K 5/02* (2006.01)

(52) U.S. Cl.
CPC ................. *G06F 1/182* (2013.01); *H05K 5/02* (2013.01)

(58) Field of Classification Search
CPC ......... G06F 1/182; H05K 5/0004; H05K 5/02; H05K 5/0213; H05K 5/0217
See application file for complete search history.

(56) References Cited

U.S. PATENT DOCUMENTS

| 6,373,692 | B1 * | 4/2002 | Cheng ..................... G06F 1/181 220/4.02 |
| 2011/0127890 | A1 * | 6/2011 | Yeh ......................... G06F 1/182 312/223.2 |
| 2011/0272306 | A1 * | 11/2011 | Chen ..................... H05K 9/0016 206/320 |
| 2012/0020015 | A1 * | 1/2012 | Tian ........................ G06F 1/182 361/679.48 |
| 2012/0125681 | A1 * | 5/2012 | Tang ..................... H05K 5/0213 174/547 |
| 2015/0022971 | A1 * | 1/2015 | Jung ........................ G06F 1/181 361/679.58 |
| 2016/0109902 | A1 * | 4/2016 | Wang ........................ G06F 1/16 312/223.1 |

* cited by examiner

*Primary Examiner* — Daniel Rohrhoff
(74) *Attorney, Agent, or Firm* — Zhigang Ma

(57) ABSTRACT

An electronic device enclosure which is fireproof and shielded against electromagnetic radiation includes a base plate, a front plate, a rear plate, a first plate, a second plate, a case configured to be secured on the base plate, and a protective film of aluminum. The case can be opened and closed like the lid of a box and the base plate, the first side plate, the second plate, and the case are made of non-metallic material. The front plate and the rear plate are made of metal. The protective film is attached to the surfaces of the base plate, the first side plate, the second plate, and the case.

19 Claims, 5 Drawing Sheets

FIRE AND RADIATION-PROOF ENCLOSURE FOR ELECTRONIC DEVICE

CROSS-REFERENCE TO RELATED APPLICATIONS

This application claims priority to Chinese Patent Application No. 201510285342.7 filed on May 29, 2015, the contents of which are incorporated by reference herein.

FIELD

The subject matter herein generally relates to enclosures for electronic devices.

BACKGROUND

An electronic device usually includes a shell and a plurality of electronic components. The electronic device can be configured to have a shape that is desired. For example, the electronic device can be configured such that it can be arranged in multiple positions. The shell can be made so as to house the plurality of electronic components.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

Figure 1:
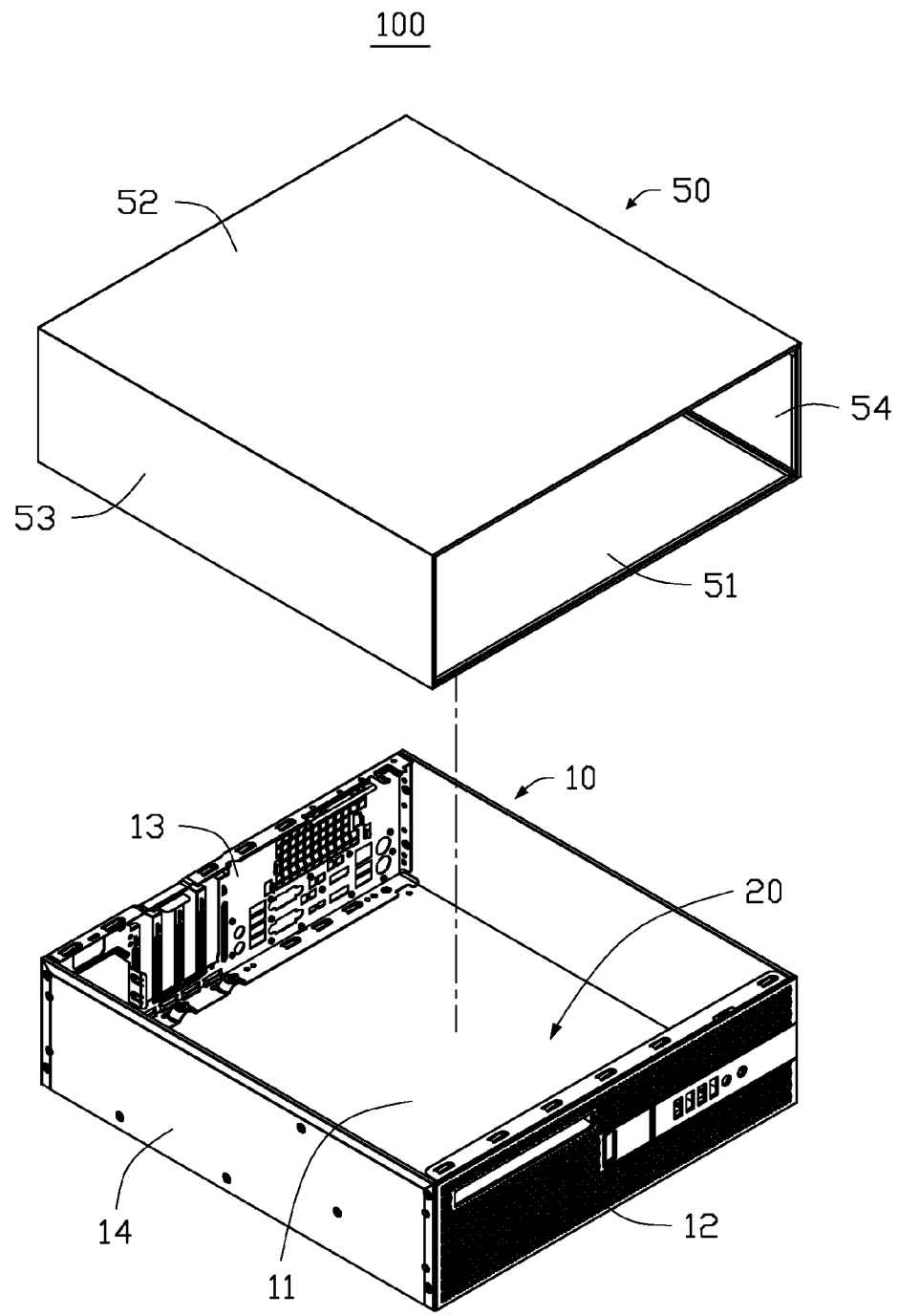
FIG. 1 is an isometric, exploded view of an embodiment of an electronic device enclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily limited to"; it specifically indicates open-ended inclusion or membership in the so-described combination, group, series and the like.

FIG. 1 illustrates one embodiment of an electronic device enclosure 100. The electronic device enclosure 100 includes a body 10 and a case 50 configured to be attached to the body 10. In at least one embodiment, the electronic device enclosure 100 can be a computer chassis.

Figure 2:
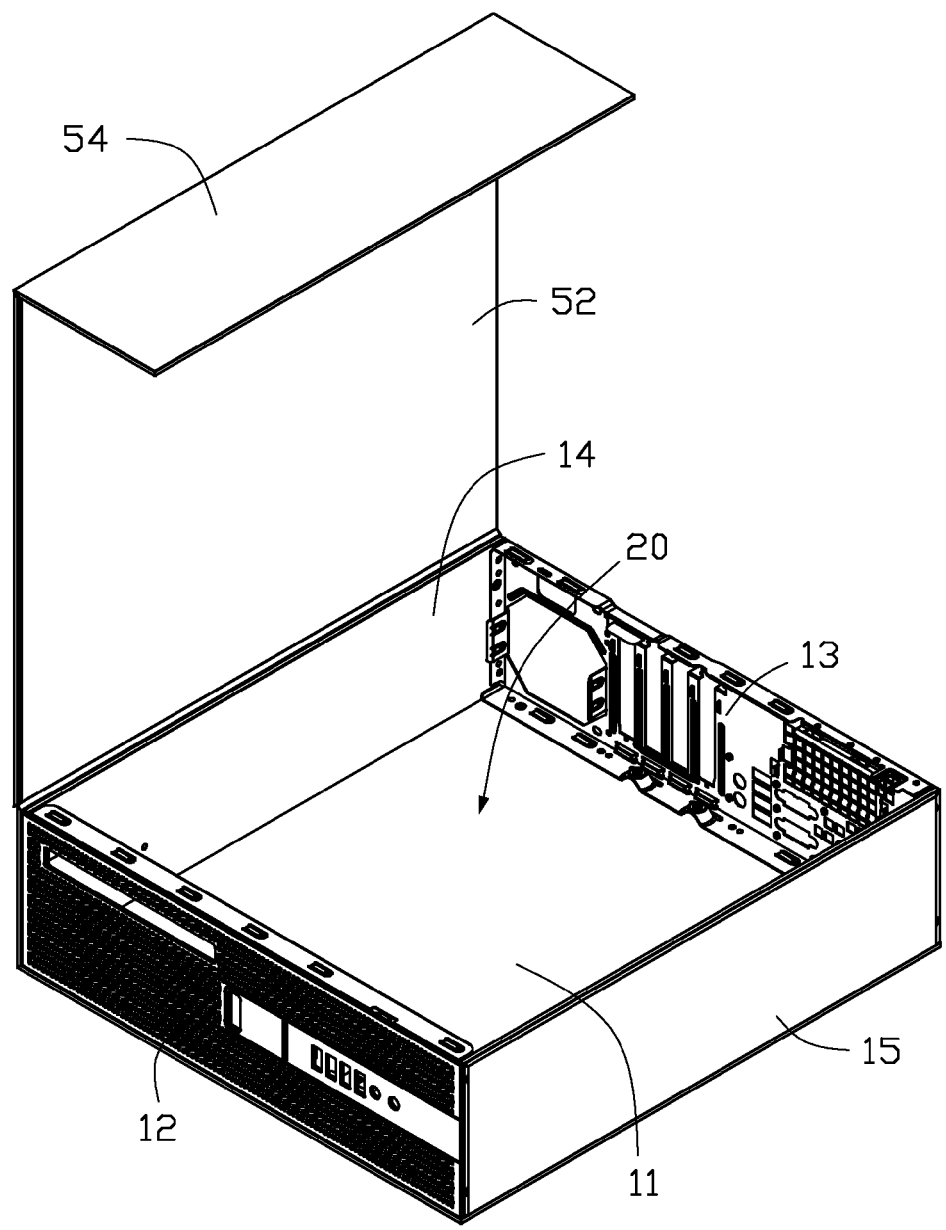
FIG. 2 is an isometric, assembled view of the electronic device enclosure of FIG. 1.

FIGS. 1 and 2 illustrate that the body 10 includes a base plate 11, a front plate 12 connected to a first edge of the base plate 11, a rear plate 13 connected to a second edge of the base plate 11, a first side plate 14, and a second side plate 15.

The base plate 11 is configured to house and secure a plurality of electronic components (not shown). The front plate 12 is substantially parallel to the rear plate 13 and perpendicular to the base plate 11. The first side plate 14 is substantially parallel to the second side plate 15 and perpendicular to the base plate 11. The base plate 11, the front plate 12, the rear plate 13, the first side plate 14, and the second side plate 15 cooperatively define a receiving space 20 which is configured to receive the plurality of electronic components. The plurality of electronic components can include a motherboard, hard disks, a plurality of expansion cards, a power supply, and so on. An outer surface of the second side plate 15 is equipped with a securing member 151 (shown in FIG. 5). The securing member 151 is configured to secure the case 50. In at least embodiment, the securing member 151 is an adhesive tape.

Figure 5:
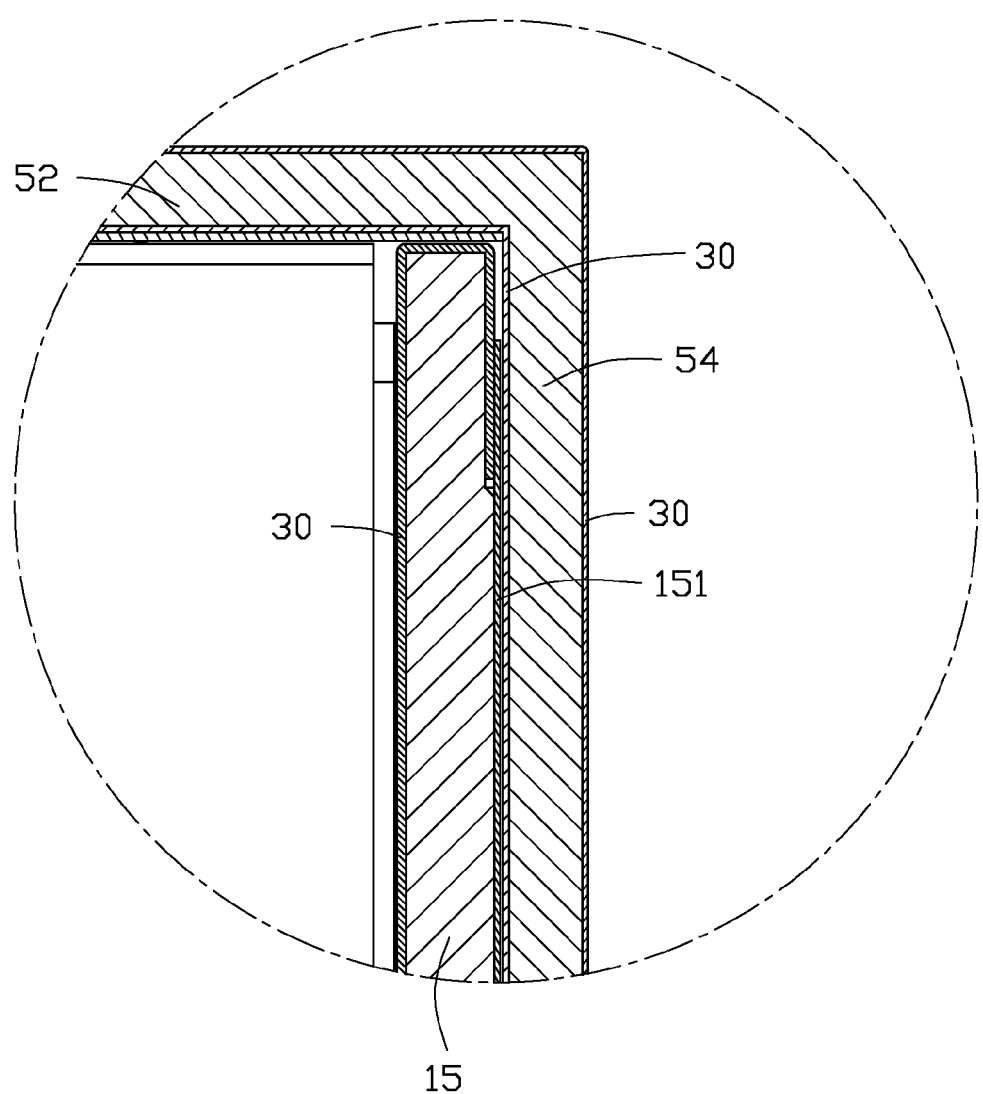
FIG. 5 is an enlarged view of circled portion V of FIG. 4.

FIG. 5 illustrates that the front plate 12 and the rear plate 13 are made of metal. The base plate 11, the first side plate 14, and the second side plate 15 are made of non-metallic material. The non-metallic material can be paper, a fibrous material, or a plastic material. In at least one embodiment, the base plate 11, the first side plate 14, and the second side plate 15 are made of paper. A protective film 30 is applied to the outer surfaces of the base plate 11, the first side plate 14 and the second side plate 15. The protective film 30 provides a fire-resistant function and a shield against electromagnetic radiation. In at least one embodiment, the protective film 30 is made of aluminum foil.

FIGS. 1 and 2 illustrate that the case includes a bottom wall 51, a top wall 52, and a first sidewall 53 connected to an edge of the bottom wall 51, and a second sidewall 54 connected to an edge of the top wall 52. The first sidewall 53 can hinge on the bottom wall 51 to allow the top wall 52 and the second sidewall 54 to act like a box lid which can be opened and closed. The protective film 30 is applied to the inner surface of the case 50 (shown in FIG. 5).

Figure 3:
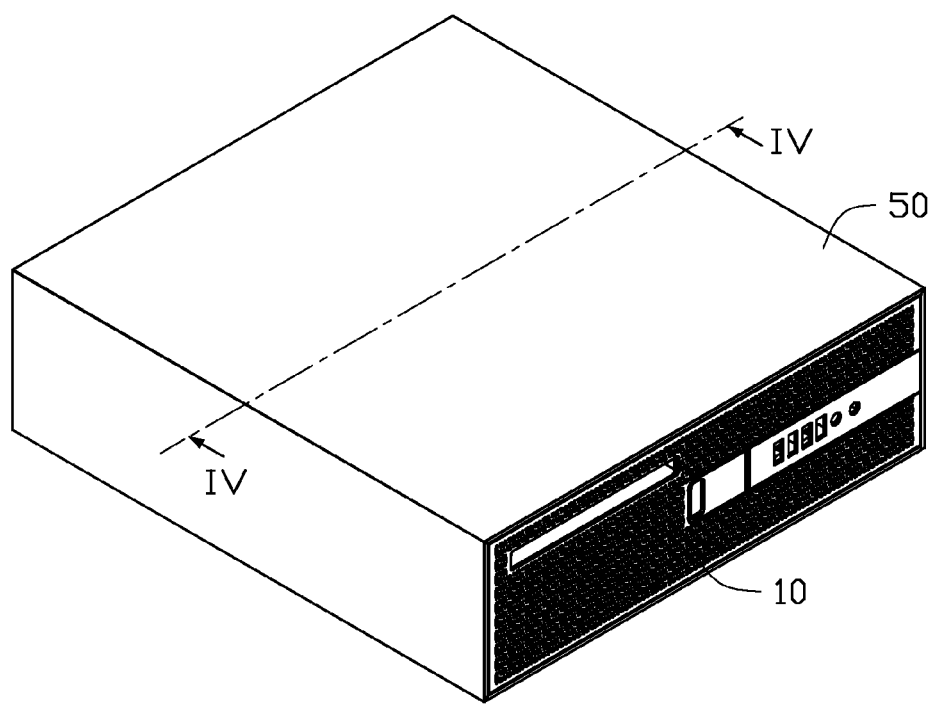
FIG. 3 is similar to FIG. 2, but viewed from a different angle.
Figure 4:
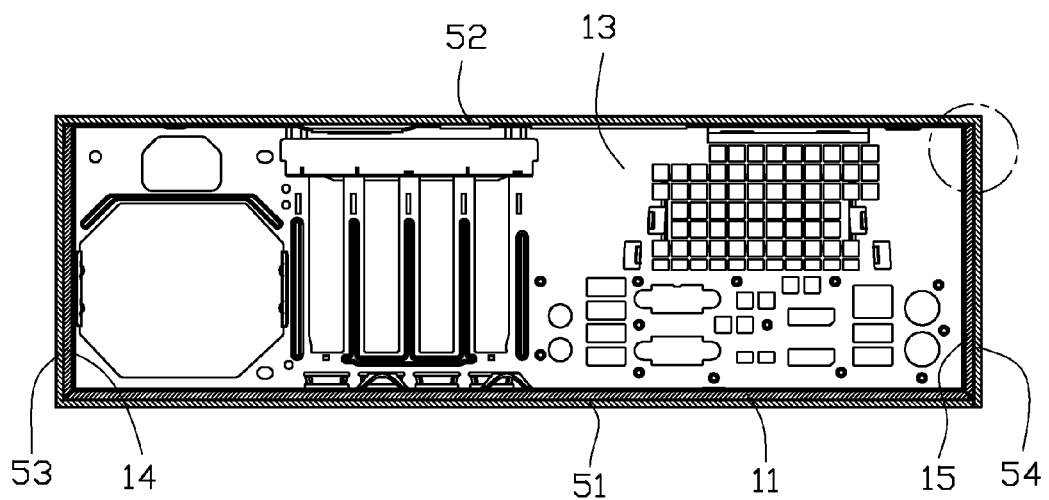
FIG. 4 is a cross sectional view of the electronic device enclosure taken along a line IV-IV of FIG. 3.

FIGS. 3 to 5 illustrate assembly, in that the bottom wall 51 is secured on the outside surface of the base plate 11. In at least one embodiment, the bottom wall 51 can be secured on the base plate 11 by such means as screw locking or pasting. The first sidewall 53 is rotatable and closely attached on the first side plate 14. The top wall 52 is attached above the receiving space 20. The second sidewall 54 is closely attached on the outside surface of the second side plate 15 and is connected with the securing member 151. The electronic device enclosure 100 is thus completely assembled.

The embodiments shown and described above are only examples. Many details are often found in the art such as the other features of an electronic device enclosure. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. An electronic device enclosure comprising:
   a body comprising a base plate, a front plate, a rear plate, a first side plate, and a second side plate;
   a case configured to be secured on the base plate and is configured to rotate and to be closely attached on the first side plate and secured on the second side plate, the base plate, the first side plate, the second side plate, and the case are made of non-metallic material, the front plate and the rear plate are made of metallic material; and
   a protective film attached to the surfaces of the base plate, the first plate, the second plate, and the case and configured to provide a fire-resistant function and an anti-electromagnetic radiation function.

2. The electronic device enclosure of claim 1, wherein the front plate is substantially parallel to the rear plate and perpendicular to the base plate.

3. The electronic device enclosure of claim 2, wherein the base plate, the front plate, the rear plate, the first side plate, and the second side plate cooperatively define a receiving space configured to receive a plurality of electronic components, and the plurality of electronic components are secured on the base plate.

4. The electronic device enclosure of claim 3, wherein the case comprises a bottom wall, the bottom wall can be secured on the base by screw locking or pasting.

5. The electronic device enclosure of claim 4, wherein the case comprises a first sidewall connected to an edge of the bottom wall, and the first sidewall is rotatable about the edge of the bottom wall to be closely attached to the first side plate.

6. The electronic device enclosure of claim 5, wherein the case comprises a top wall connected to an edge of the first sidewall, and the top wall is rotatable to be attached above the receiving space.

7. The electronic device enclosure of claim 6, wherein the case comprises a second sidewall connected to an edge of the top wall, and the second sidewall is rotatable to be secured on the second side plate.

8. The electronic device enclosure of claim 1, wherein the outside surface of the second side plate is equipped with a securing member configured to secure the case.

9. The electronic device enclosure of claim 1, wherein the non-metallic material is a paper material.

10. The electronic device enclosure of claim 1, wherein the protective film is an aluminum foil.

11. An electronic device enclosure comprising:
    a body comprising a base plate, a front plat, a rear plate, a first side plate, and a second side plate;
    a case comprising a bottom wall secured on the base plate, a first sidewall connected to an edge of the bottom wall and closely attached on the first plate, and a second sidewall secured on the second side plate, the base plate, the first side plate, the second side plate, and the case are made of non-metallic material, the front plate and the rear plate are made of metallic material; and
    a protective film attached to the surfaces of the base plate, the first plate, the second plate, and the case and configured to provide a fire-resistant function and an anti-electromagnetic radiation function.

12. The electronic device enclosure of claim 11, wherein the front plate is substantially parallel to the rear plate and perpendicular to the base plate.

13. The electronic device enclosure of claim 12, wherein the base plate, the front plate, the rear plate, the first side plate, and the second side plate cooperatively define a receiving space configured to receive a plurality of electronic components, and the plurality of electronic components are secured on the base plate.

14. The electronic device enclosure of claim 13, wherein the bottom wall can be secured on the base plate by screw locking or pasting.

15. The electronic device enclosure of claim 14, wherein the first sidewall connected to an edge of the bottom wall, and the first sidewall is rotatable about the edge of the bottom wall to be closely attached to the first side plate.

16. The electronic device enclosure of claim 15, wherein the case comprises a top wall connected to an edge of the first sidewall, and the top wall is rotatable to be attached above the receiving space.

17. The electronic device enclosure of claim 11, wherein the outside surface of the second side plate is equipped with a securing member configured to secure the case.

18. The electronic device enclosure of claim 11, wherein the non-metallic material is a paper material.

19. The electronic device enclosure of claim 11, wherein the protective film is an aluminum foil.

* * * * *